United States Patent
Tamura et al.

(10) Patent No.: US 10,267,966 B2
(45) Date of Patent: Apr. 23, 2019

(54) COMPOSITE FUNCTIONAL POLARIZED LENS

(71) Applicant: Talex Optical Co., Ltd., Osaka (JP)

(72) Inventors: Kanichi Tamura, Osaka (JP); Shoichi Mitsuuchi, Osaka (JP); Kenzo Wada, Osaka (JP); Ryogo Nitta, Osaka (JP)

(73) Assignee: TALEX OPTICAL CO., LTD., Osaka (JP)

( * ) Notice: Subject to any disclaimer, the term of this patent is extended or adjusted under 35 U.S.C. 154(b) by 0 days.

(21) Appl. No.: 15/097,601

(22) Filed: Apr. 13, 2016

(65) Prior Publication Data

US 2017/0299782 A1 Oct. 19, 2017

(51) Int. Cl.
*G02C 7/12* (2006.01)
*G02B 5/30* (2006.01)
(Continued)

(52) U.S. Cl.
CPC ............ *G02B 5/3033* (2013.01); *B29D 11/00* (2013.01); *B29D 11/00528* (2013.01); *G02B 1/041* (2013.01); *G02B 1/10* (2013.01); *G02B 5/003* (2013.01); *G02B 5/208* (2013.01); *G02B 5/22* (2013.01); *G02B 5/30* (2013.01); *G02B 5/305* (2013.01); *G02B 5/3041* (2013.01); *G02C 7/02* (2013.01); *B29D 11/00644* (2013.01);
(Continued)

(58) Field of Classification Search
CPC .......... G02C 7/12; G02B 5/30; G02B 5/3025; G02B 5/3033; G02B 5/3041
USPC ........................ 351/159.27, 159.56, 159.62
See application file for complete search history.

(56) References Cited

U.S. PATENT DOCUMENTS 5,751,481 A * 5/1998 Dalzell ................. B29C 51/428
  264/1.32
6,220,703 B1 * 4/2001 Evans ..................... B29C 51/10
  351/159.56
(Continued)

FOREIGN PATENT DOCUMENTS

JP  63-175071  7/1988
JP  2001-311804  11/2001
(Continued)

OTHER PUBLICATIONS

Ivory, Rena, "What is Insert Molding for Plastic Components?", Jan. 23, 2014, Crescent Industries, Inc., pp. 1-3.*
(Continued)

*Primary Examiner* — Darryl J Collins
(74) *Attorney, Agent, or Firm* — Wenderoth, Lind & Ponack, L.L.P.

(57) ABSTRACT

A composite functional polarized lens is a polarized lens in which lens substrate layers made of, for example, an allyl diglycol carbonate resin (produced by PPG Industries: CR-39), an urethane resin or other predetermined resin are integrally formed on both front and back surfaces of a polarizing film by way of insert molding, wherein a first lens substrate layer formed on the front surface of both the front and back surfaces of the polarizing film contains a light absorber which is an ultraviolet absorber, an infrared absorber, photochromic light absorber or a thermochromic light absorber as an additional component, and a second lens substrate layer formed on the back surface does not contain the light absorber.

4 Claims, 3 Drawing Sheets

(51) Int. Cl.
  *G02B 5/00* (2006.01)
  *G02B 1/04* (2006.01)
  *G02C 7/02* (2006.01)
  *G02B 1/10* (2015.01)
  *B29D 11/00* (2006.01)
  *G02B 5/20* (2006.01)
  *G02B 5/22* (2006.01)
  *G02C 7/10* (2006.01)

(52) U.S. Cl.
  CPC .............. *G02C 7/102* (2013.01); *G02C 7/12* (2013.01); *G02C 2202/24* (2013.01)

(56) References Cited

U.S. PATENT DOCUMENTS

| | | | | |
|---|---|---|---|---|
| 7,967,434 | B2* | 6/2011 | Miura | B29D 11/0073 |
| | | | | 264/1.32 |
| 7,999,989 | B2* | 8/2011 | Asai | B29D 11/0073 |
| | | | | 359/241 |
| 8,147,946 | B2* | 4/2012 | Kato | G02B 3/00 |
| | | | | 359/642 |
| 2001/0028435 | A1* | 10/2001 | Evans | B29C 33/0061 |
| | | | | 351/159.56 |
| 2007/0171537 | A1 | 7/2007 | Fung | |
| 2008/0029914 | A1 | 2/2008 | Hamanaka | |
| 2010/0110542 | A1* | 5/2010 | Sasaki | B29D 11/00634 |
| | | | | 359/485.01 |
| 2013/0141693 | A1* | 6/2013 | McCabe | G02C 7/104 |
| | | | | 351/159.56 |
| 2013/0155507 | A1 | 6/2013 | Ryu et al. | |
| 2013/0271725 | A1* | 10/2013 | Chiou | G02C 7/10 |
| | | | | 351/159.56 |
| 2014/0334000 | A1 | 11/2014 | Clerc et al. | |
| 2018/0002459 | A1* | 1/2018 | Endo | C08F 2/44 |

FOREIGN PATENT DOCUMENTS

| | | |
|---|---|---|
| JP | 2005-43921 | 2/2005 |
| JP | 2006-82421 | 3/2006 |
| JP | 2006-189565 | 7/2006 |
| JP | 2006-205710 | 8/2006 |
| JP | 5075080 | 8/2012 |
| JP | 2012-173704 | 9/2012 |
| JP | 2013-109257 | 6/2013 |
| JP | 2013-524296 | 6/2013 |
| JP | 2015-69045 | 4/2015 |
| WO | 2011/130137 | 10/2011 |
| WO | 2012/020570 | 2/2012 |
| WO | 2013/034557 | 3/2013 |

OTHER PUBLICATIONS

Notification of Reasons for Refusal dated Jan. 31, 2017 in Japanese Application No. 2013-203964, with English translation.
Notification of Reasons for Refusal dated Apr. 18, 2017 in Japanese Application No. 2013-203964, with English translation.

* cited by examiner

COMPOSITE FUNCTIONAL POLARIZED LENS

TECHNICAL FIELD

The present invention relates to a composite functional polarized lens which has, in addition to a polarization function, other particular functions and a production method thereof.

BACKGROUND ART

Generally, a lens substrate for polarized eyeglasses is prepared by integrating the lens substrate for eyeglasses with a polarizing element having a polarizing membrane (film), wherein the polarizing membrane is prepared by stretching uniaxially a resin film such as polyvinyl alcohol and impregnating the resultant with iodine or the like.

A lens substrate for eyeglasses used for visual correction includes a convex lens surface formed on its front surface, and a concave shape, a flat shape, etc. formed on its back surface. When the lens substrate is adjusted as an eyeglass lens to an appropriate optical power for a consumer, the back surface is sometimes ground while the front surface is not ground but applied with a coating containing any functional component.

For producing a lens substrate for polarized eyeglasses by a cast molding (casting) method, a production method is well known in which the circumference of a polarizing film pressure-molded in a hemispherical shape in advance is retained in the inner periphery of a ring-shaped gasket with the same diameter as the lens substrate, a pair of molds for forming concave•convex shaped lens surfaces is fixed integrally to the gasket with each mold placed at a predetermined distance away from the front and back surfaces of the polarizing film, a monomer is injected into a gap (cavity) which determines the lens thickness between the pair of molds and retained for a required period of time at a required temperature to undergo a polymerization reaction, and thus the cured resin is integrated with a polarizing element (see JP 2001-311804A).

Furthermore, in order for the lens substrate for eyeglasses to retain a functional component, for example, a method is known of applying in the form of a layer a coating liquid prepared by dispersing an infrared absorber in a binder resin on a surface of the lens and drying the resultant to form an infrared absorbing layer (see JP 2005-43921).

However, the above conventional technique of an eyeglass lens has not been able to exert sufficiently a required function such as a desired infrared absorbing performance when, in the case of the coating of an infrared absorber on the lens surface, the thickness of the coating layer is formed as thin as possible in order not to reduce the optical characteristics of the lens substrate.

In addition, when a costly function-imparting agent such as an ultraviolet ray absorber or an infrared absorber is dispersed and retained on a lens substrate for visual correction addressing myopia, a grinding operation for achieving a required optical power removes the most part of the lens substrate. The most part of the additional function-imparting agent is thus wasted without performing its function, which results in a poor efficiency of addition of a functionality-imparting agent. Therefore, a problem arises that the manufacturing cost increases.

In order to address above-described problems, in their previous patent application, inventors of the present invention formed, by way of insert molding of polyurethane resin materials, a polarizing element by coating both surfaces of a polarizing film with a polyurethane resin containing an infrared absorber and formed a lens substrate for eyeglasses used in grinding for adjustment of the optical power with a polyurethane resin which does not contain an infrared absorber, and then configured an infrared-absorbing lens substrate for polarized eyeglasses by integrally depositing the polarizing element on one surface of the lens substrate for eyeglasses (see JP 5075080).

However, as described above, when a lens substrate for polarized eyeglasses is produced by insert-molding a polarizing element formed by coating a resin containing an infrared absorber on both surfaces of a polarizing film and a lens substrate for eyeglasses used in grinding for adjustment of the optical power, the resin forming the front and back surfaces of the polarizing element has been already cured and an uncured resin layer is further formed thereon. This causes a problem in some cases that, depending on the resin type, the laminate integration is not good sufficiently, and that, especially for diethyleneglycol-bis-allylcarbonate (CR-39), the integration by lamination is unlikely to be ensured.

In addition, on the border between the resin layer formed in advance on one surface of the polarizing element and the second resin layer additionally formed on the resin layer during insert molding, an optically distinguishable interface is formed due to difference in flow direction of the resins during the molding, a difference in heat history of molding heat applied once or more, and the like. When such an eyeglass lens is subjected to what is called "prescription lens processing" to form a ground surface crossing the interface, a light shadow (a ring-shaped light shadow around the entire circumference of the lens) along the interface on the ground surface is visually confirmed, which leads to a problem that the quality of the lens for eyeglasses such as even transparency is ruined.

One problem of the present invention is to solve the above problems, in other words, to provide a composite functional polarized lens which has a good adhesive property in the interface without the occurrence of an optical spot on the border between lens substrates laminated in the polarized lens, has good efficiency of addition of a function-imparting agent for such as thermochromic, photochromic, ultraviolet ray and infrared ray absorption, and ensures sufficiently these additional functions. Another problem is, when a polarizing film is insert-molded (cast-molded), to provide a composite functional polarized lens which shows good adhesive integration by lamination regardless of the resin type.

SUMMARY OF THE INVENTION

In order to solve the above problems, the present invention provides a composite functional polarized lens comprising a polarized lens in which lens substrate layers comprising a predetermined resin are integrally formed on both front and back surfaces of a polarizing film by way of insert molding, wherein a first lens substrate layer formed on one of the both front and back surfaces of the polarizing film contains a light absorber as an additional component, and a second lens substrate layer formed on the other surface does not contain the light absorber.

For the composite functional polarized lens of the present invention configured as described above, the resin is not coated and cured in advance on both the surfaces of the polarizing film used for insert molding, and both the surfaces of the polarizing film are simultaneously molded with the same predetermined resin. Therefore, there is no optically distinguishable interface due to a difference in heat history of the polarizing film and the predetermined resin forming the lens substrate layers before the insert molding, a difference in resin fluidity between during the pre-molding and during the insert molding.

As a result, even when a ground surface crossing the interface is formed, a light shadow along the interface is not formed on the ground surface, and the adhesive property in the interface is also good. Even when diethyleneglycol-bis-allylcarbonate (CR-39) is used as the predetermined resin, the integration of the polarizing film and substrate layers is ensured.

In addition, the first lens substrate layer formed on one of the both front and back surfaces of the polarizing film contains a light absorber as an additional component while the second lens substrate layer formed on the other surface does not contain the light absorber. When a prescription lens for visual correction is formed, this configuration can reduce the amount of grinding sludge of the first lens substrate layer containing a light absorber as much as possible by grinding the second lens substrate layer which does not contain a light absorber. The light absorber(s) can be thus utilized efficiently, resulting in low cost.

Thus, providing a composite functional polarized lens wherein the above light absorber is an ultraviolet absorber, an infrared absorber, a photochromic light absorber or a thermochromic light absorber allows the composite functional polarized lens to have good efficiency of addition of a function-imparting agent for such as thermochromic, photochromic, ultraviolet ray and infrared ray absorption and to ensure sufficiently these additional functions.

Moreover, in order to reduce the amount of the grinding sludge of the first lens substrate layer containing a light absorber, the second lens substrate layer on the other surface of the polarizing film is formed to be a lens substrate layer comprising the predetermined resin which does not contain a light absorber. However, the second lens substrate layer may contain a different type of a light absorber than the light absorber(s) as an additional component of the first lens substrate layer.

For example, a composite functional polarized lens in which a first lens substrate layer contains a photochromic light absorber while a second lens substrate layer contains a thermochromic light absorber allows the thermochromic light absorber to function within a temperature range which decreases the function of the photochromic light absorber, and thus allows both light absorbers to compensate for each other's drawbacks.

Furthermore, since both surfaces of the polarizing film are simultaneously molded with the same predetermined resin, even if the predetermined resin is allyl diglycol carbonate resin which shows a poor lamination property with the same resin and is likely to cause detachment between the layers, the composite functional polarized lens as prepared above ensures the adhesive integration by lamination.

Effects of the Invention

The composite functional polarized lens of the present invention is prepared by integrally forming lens substrate layers comprising a predetermined resin on both front and back surfaces of a polarizing film by way of insert molding, wherein one surface of the polarizing film contains a light absorber, and the other side does not contain the light absorber. This configuration has an advantage that the composite functional polarized lens has a good adhesive property in the interface without the occurrence of an optical spot on the border between lens substrates laminated in the polarized lens, has good efficiency of addition of a function-imparting agent for such as thermochromic, photochromic, ultraviolet ray and infrared ray absorption, and ensures sufficiently these additional functions.

In addition, when the polarizing film is insert-molded (cast-molded), this configuration also has an advantage that the composite functional polarized lens shows good adhesive integration by lamination regardless the resin type.

DETAILED DESCRIPTION OF THE INVENTION

Figure 1:
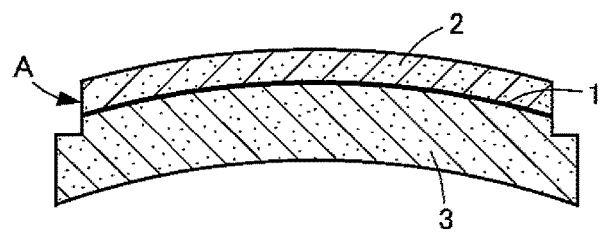
FIG. 1 represents a cross sectional view of a composite functional polarized lens according to an embodiment.
Figure 2:
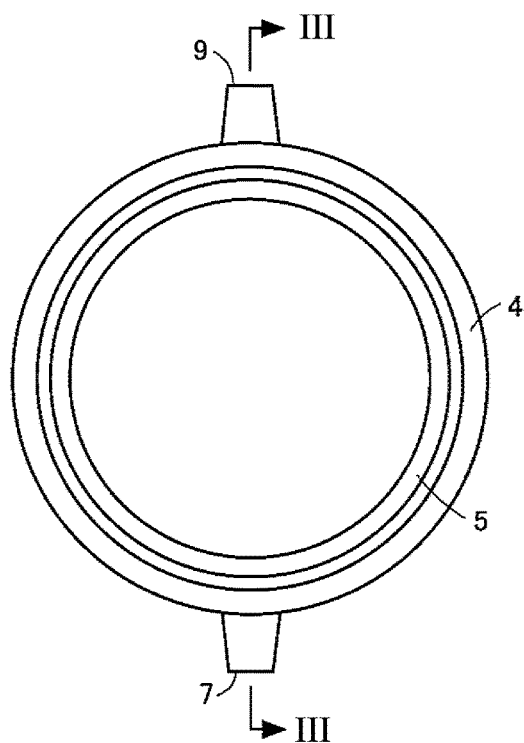
FIG. 2 represents a plan view of a gasket used for insert molding of a composite functional polarized lens according to an embodiment.
Figure 3:
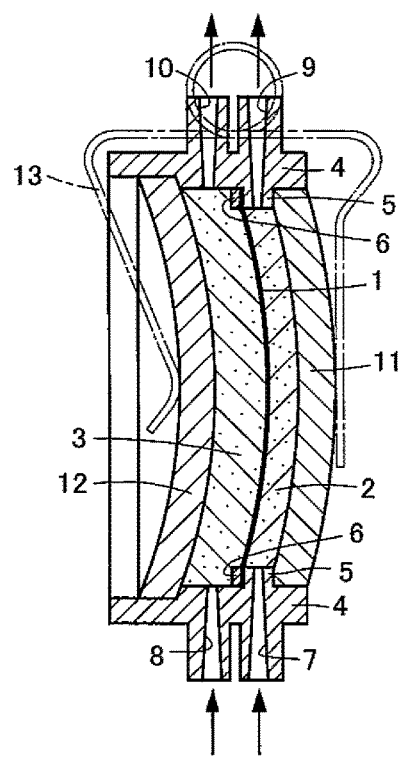
FIG. 3 represents a cross sectional view of a gasket and a mold taken along in direction III to III in FIG. 2.

The embodiments of the present invention will be explained below with reference to the appended drawings. As illustrated in FIGS. 1 to 3, in one embodiment, lens substrate layers comprising an allyl diglycol carbonate resin (produced by PPG Industries: CR-39), a urethane resin or other predetermined resin are formed integrally on both front and back surfaces of a polarizing film 1 by insert molding. A first lens substrate layer 2 formed on the front surface of both the front and back surfaces of the polarizing film 1 contains a light absorber which is an ultraviolet absorber, an infrared absorber, a photochromic light absorber or a thermochromic light absorber as an additional component. A second lens substrate layer 3 formed on the back surface does not contain the light absorber, and thus a composite functional polarized lens A is provided.

For this composite functional polarized lens, the resin molding materials containing the same predetermined resin as a major component are cast-molded simultaneously on both surfaces of the polarizing film 1 by way of insert molding described later.

The polarizing film 1 is obtained according to a well-known method. For example, it is preferred to employ a polarizing film prepared by uniaxially stretching a polyvinyl alcohol (PVA) film containing through impregnation iodine or an iodine compound or a dye, etc.

For the polarizing film 1, the material thereof is not limited to PVA. A composite film of polyethylene terephthalate (PET) or PVA film combined with a film composed of triacetyl cellulose, polycarbonate, etc. may also be used.

The polarizing film 1 such as the uniaxially stretched PVA film is cut into a rectangle corresponding to the size of a meniscus shaped lens. A curved surface of a spherical shape is formed along the curve of the lens (radius of curvature) by way of known pressure molding (press molding), and then the resulting polarizing film 1 is used in insert molding.

For the predetermined resin, a broad range of resins capable of cast-molding (casting) an eyeglass lens, including the above-mentioned resin examples, can be used. For example, MMA (methyl methacrylate resin) and PC (polycarbonate resin) which are excellent in transparency as a thermoplastic resin as well as CR-39 and an intermediate-refractive index resin (e.g., Nippon Oil & Fats Co., Ltd: Corporex, refractive index 1.56) which are representative heat curing resins of a casting type and include allyl diglycol carbonate as its component are included. A thiourethane resin, a well-known high-refractive index resin in which isocyanate and polythiol are combined (for example, produced by Mitsui Chemicals, Inc.: thiourethane resin MR-7, refractive index 1.67) is also included.

Examples of the light absorber(s) added in such a predetermined resin forming lens substrates include ultraviolet absorbers, infrared absorbers, photochromic light absorbers and thermochromic light absorbers.

Among these, for the ultraviolet absorber, a known ultraviolet absorber which absorbs ultraviolet rays with a wavelength from 100 nm to 380 nm can be used. Specific examples thereof include the following compounds.
(1) 2-hydroxy-4-n-octoxybenzophenone
(2) 4-dodecyloxy-2-hydroxybenzophenone
(3) 2-2'-hydroxy-4-methoxybenzophenone When an ultraviolet absorber is used, all the ultraviolet rays including the UV-A with a long wavelength (315 to 400 nm), UV-B with a short wavelength (280 to 315 nm) and UV-C with a shorter wavelength (100 to 280 nm) are preferably absorbed.

For the amount of addition of an ultraviolet absorber, based on 100 parts by weight of the resin materials forming the lens substrate, the range of 0.01 to 4 parts by weight, preferably 0.1 to 4.0 parts by weight, more preferably 0.2 to 0.5 parts by weight is suitable since this range exhibits good efficiency of addition and good absorbability of ultraviolet rays.

For the infrared absorber, a known infrared absorber which absorbs infrared rays with a wavelength from 780 nm to 2500 nm can be used. Examples thereof include the following compounds.
(1) infrared absorbers composed of a N,N,N',N'-tetrakis(p-substituted phenyl)-p-phenylenediamine, a benzidine and an aluminum salt and a diimmonium salt thereof.
(2) N,N,N',N'-tetraaryl quinone diimmonium salts
(3) Bis-(p-dialkylamino phenyl)[N, N-bis(p-dialkylamino phenyl)p-aminophenyl]aminium salt.

The amount of addition of an infrared absorber is, based on 100 parts by weight of the resin materials forming the lens, usually in the range of 0.05 to 10 parts by weight. When used in the application other than a light-blocking protection tool, the range of 0.1 to 1.0 parts by weight is suitable.

A photochromic light absorber is also referred to as a photochromic compound. Examples thereof include known spirooxazine compounds and tetra-(or hexa-)benzoperopyrene compounds.

A spirooxazine compound is confirmed to have a characteristic that its weather resistance is lessened by ultraviolet rays with a short wavelength. Therefore, by enveloping a particulate spirooxazine compound with an inorganic light-blocking membrane and dispersing the compound in a resin matrix, a spirooxazine compound can be used in a form which has weather resistance (JP 63-175071 A).

In particular, in order for a photochromic lens to have a shortest possible response time required to clear the lens by the photochromic property, and suppress performance deterioration by ultraviolet rays and maintain weather resistance, it is preferred that, based on 100 parts by mass of a resin lens, 0.03 to 0.2 parts by mass of a spirooxazine photochromic compound, preferably a spirooxazine photochromic compound represented by the Chemical Formula 1 is dissolved in tetrahydrofuran, mixed and dispersed evenly therein.

[Chemical Formula 1]

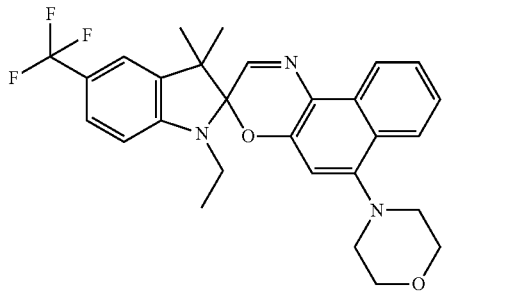

The above photochromic compound is dissolved in tetrahydrofuran and dispersed evenly in a resin. The lens with the photochromic compound thus dispersed deteriorates in some cases due to ultraviolet rays penetrating the lens thickness of about 0.5 mm in general from the surface, but the deterioration of a deeper part is unlikely. Therefore, as a whole, the lens is a photochromic lens having a weather resistance characteristic.

A thermochromic light absorber is a compound which changes the light absorbability depending on the temperature. Examples of thermochromic compounds with such a characteristic include leuco dyes and liquid crystal particles.

Specific examples of thermochromic liquid crystals include cholesteryl nonanoate and cyanobiphenyl. Examples of leuco dyes include spirolactone, fluoran, spiropyran, fulgide and any combination thereof. A liquid crystal and a leuco dye may be microencapsulated and mixed in a polymerizable mixture.

The amount of the thermochromic compound used can be adjusted to an effective amount which achieves the reduction of penetration (%) at a certain wavelength depending on the materials of the lens substrates as well as lens thickness.

Insert molding performed in the present invention will be explained below.

As illustrated in FIGS. 2 and 3, in order to insert-mold a polarizing film 1 such that the film is embedded in the lens substrates, the circumference of the disk-shaped polarizing film 1 which is curved in a spherical shape along the curve of the lens (radius of curvature) is engaged with a side surface of a circular convex portion 5 which is configured to protrude inwardly from the inner periphery of a cylindrical gasket 4 formed with a flexible resin such as a silicone resin. A locking ring 6 pushed toward the inner periphery of the gasket 4 is further placed on the circumference, and thus the circumference of the polarizing film 1 is retained in the gasket 4 between the elastically retained locking ring 6 and the circular convex portion 5.

On both sides of the polarizing film 1 in the axial direction of the cylindrical gasket 4, resin injection holes 7 and 8 penetrate respectively the wall of the gasket 4 on each side. On the side opposite to resin injection holes 7 and 8 are open overflow holes 9 and 10 which penetrate the wall.

A pair of molds 11 and 12 in which the concave surface and the convex surface corresponding to a lens shape can be placed opposite to each other is placed such that there are appropriate gaps between the polarizing film 1 and the molds, and engaged liquid-tightly with the gasket 4. The pair of molds 11 and 12 is pinched by a spring clip 13 or the like in the axial direction and thus elastically fixed.

The gap between the concave surface of the mold 11 and the convex surface of the polarizing film 1 can be set, for example, about 1 mm or about 2 to 5 mm if necessary. The gap between the convex surface of the mold 12 and the concave surface of the polarizing film 1 can be set, for example, approximately 8 to 18 mm for a semi-product or approximately 1 to 10 mm for a plano-product.

The gasket 4 is arranged so that the resin injection holes 7 and 8 are on the lower side as illustrated in FIG. 3. An elongated cavity is formed between the opposing surfaces of the two molds. A resin material blended with a light absorber (s) as an additional component and degassed is injected into the cavity through the resin injection hole 7 on the lens front surface side. Simultaneously with this injection, a degassed resin material which does not contain the light absorber(s) is injected into the cavity through the resin injection hole 8 on the lens back surface side. These resin materials are completely filled within the cavity while gas is released from respective overflow holes 9 and 10. Heat curing is then carried out to polymerize and cure each resin material, thus completing the insert molding of a composite functional polarized lens having a particular light absorbing function and a polarization function in combination.

A mold thus configured for insert molding can be used to provide a first lens substrate layer which is formed on one of both front and back surfaces of the polarizing film and contains a light absorber as an additional component as well as and a second lens substrate layer which is formed on the other surface and does not contain the light absorber, and further to manufacture a composite functional polarized lens having various functions by integrating the polarizing film 1 with the lens substrates 2 and 3.

Figure 4:
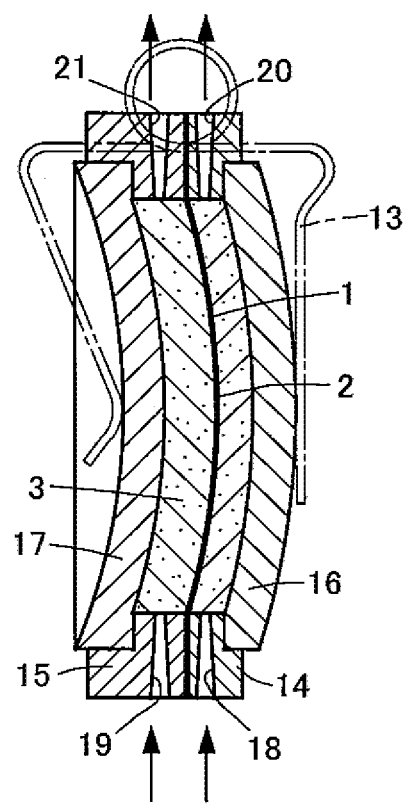
FIG. 4 represents a cross sectional view of a gasket and a mold used for insert molding of a composite functional polarized lens according to another embodiment.

Furthermore, as illustrated in FIG. 4, gaskets 14 and 15 in a different form than mentioned above can be used as a pair to perform insert molding.

In other words, a mold 16 for forming a convex surface of a lens and a ring-shaped gasket 14 retaining the mold 16 are used as a pair and a mold 17 for forming a concave surface of a lens and a ring-shaped gasket 15 retaining the mold 17 are used as another pair. These gaskets 14 and 15 are formed with resin injection holes 18 and 19 and overflow holes 20 and 21 respectively. The mold holding sides and opposite sides of the gaskets 14 and 15 are opposed, and the circumference of the polarizing film 1 is pinched between the opposing sides and fixed by a spring clip 13 or the like.

The polarizing film 1 can be integrated with the first lens substrate layer 2 and the second lens substrate layer 3 to produce a composite functional polarized lens having various functions in the same manner as mentioned above except that the gaskets 14 and 15 and molds 16 and 17 are used.

EXAMPLES

Example 1

According to the above insert molding step, each resin molding material was cast-molded from the two gates simultaneously to produce a composite functional polarized lens in which, regarding both surfaces of the polarizing film, a first lens substrate layer contained a light absorber as an additional component and a second lens substrate layer formed on the other surface did not contain the light absorber, both of which contained a predetermined resin as a major component.

In other words, a composite functional eyeglass lens (eyeglass lens for visual correction (semi-product) or plano (flat) eyeglass lens) was prepared in which a photochromic light absorber (dye) was added to the first lens substrate layer on the convex surface side while a thermochromic dye was added instead of the photochromic light absorber to the second lens substrate layer on the concave surface side.

For the first lens substrate layer, based on 100 parts by mass of a prepolymer (ultraviolet absorber-free) prepared by reacting polyisocyanate and a polyhydroxy compound, 0.05 parts by mass of a spirooxazine photochromic compound represented by the Chemical Formula 1 (Yamada Chemical Co., Ltd.: PSP-33, red-violet), 0.02 parts by mass of a blue-green spirooxazine photochromic compound (Yamada Chemical Co., Ltd.: PSP-54), and 0.06 parts by mass of an orange photochromic compound (Yamada Chemical Co., Ltd.: PSP-92) were dissolved in THF (tetrahydrofuran), added to the prepolymer, and then mixed, stirred and degassed in vacuum. Then, an equivalent amount of aromatic polyamine (MOCA) was added to the mixture of the prepolymer and the compounds as a curing agent to give a resin material.

For the second lens substrate layer, the polyurethane prepolymer used in the first lens substrate layer was used in the same manner except that a thermochromic compound (cholesteryl nonanoate, etc.) was blended instead of the photochromic light absorber to give a resin material.

In the cast molding, each resin molding material for the first lens substrate layer and the second lens substrate layer was injected into the cavity of the glass mold having the configuration described in one embodiment, maintained for 3 hours at 40° C., heated gradually and cured for 24 hours at 100° C., followed by cooling. The resultant was removed from the mold to obtain a composite functional polarized lens for eyeglasses.

Conventional photochromic optical lenses had a flaw that the photochromic performance decreased significantly at a high temperature (30° C. or more), but a composite functional polarized lens for eyeglasses utilizing a thermochromic layer in combination as prepared above retained the clear and dark difference even when used at a temperature of 30° C. or more, and its performance was maintained even after the weather resistance test.

Example 2

A composite functional polarized lens for eyeglasses was cast-molded in the same manner as in Example 1 except that 1% by mass of a diimmonium compound (Nippon Kayaku Co., Ltd.: IRG-022) was added as an infrared absorber instead of the photochromic compound to the polyurethane prepolymer in Example 1 forming the convex surface layer of the first lens substrate layer, and that a transparent polyurethane prepolymer with no light absorber added was used for the concave surface layer of the second lens substrate layer.

The resulting composite functional eyeglass lens had a thickness about half of the conventional lens obtained by cast molding via two-step polymerization (an embodiment in Patent Document 3). Further, no ring-shaped spot occurred even after the prescription lens grinding for visual correction was applied.

Example 3

A composite functional polarized lens for eyeglasses was cast-molded in the same manner as in Example 2 except that an allyl diglycol carbonate resin (CR39) was used for cast molding instead of the polyurethane prepolymer in Example 2, and that the resin materials were maintained for 7 hours at 30° C. and heated gradually, followed by curing for 8 hours at 80 to 100° C.

The resulting composite functional polarized lens for eyeglasses showed good laminate integration of the convex surface layer, the concave surface layer and the polarizing film and had no peeling between layers despite the use of an allyl diglycol carbonate resin (CR39). In addition, even after a ground surface crossing all the layers was formed, no light shadow along the interface was visually confirmed on the ground surface and thus, the quality was good.

Comparative Example 1

In Example 1, a photochromic light absorber (dye) was added to the first lens substrate layer on the convex surface side, and a thermochromic dye, instead of this photochromic light absorber, was added to the second lens substrate layer on the concave surface side. In Comparative Example 1, a composite functional polarized lens for eyeglasses was prepared in the same manner except a photochromic dye and a thermochromic dye were mixed and added to the first lens substrate layer on the convex surface side.

The resulting polarized lens of Comparative Example 1 exhibited light absorbability even at a high temperature of 30° C. or more at an early stage, but after about one-month exposure to ultraviolet rays outside, the performance deteriorated to the same degree as a lens in which only a photochromic dye was added.

Comparative Example 2

A transparent lens with a thickness of 10 mm was prepared in advance, using an impact-resistant urethane which was the same as the urethane resin used in Example 1. Transparent lenses with a variety of curve types (1 curve, 2 curve, 4 curve, 6 curve, 8 curve, etc.) were prepared with the thickness in the range of 8 mm to 20 mm.

When a gasket was set in the glass molds (male mold and female mold), the transparent lens prepared in advance was set on the concave surface side. To impact-resistant urethane of about 1 mm on both sides of the polarized lens with a thickness of about 2 mm was added 1% by mass of an infrared absorber, and cast molding was performed.

The lens thus prepared through twice casting two-step molding (also referred to as two-step polymerization) was visually confirmed to have a light shadow (transparent ring) along the interface for lenses of any curve when a ground surface crossing the interface between the functionality layer and the transparent layer was formed for required visual correction.

Comparative Example 3

Using a transparent lens with a thickness of 10 mm prepared with an allyl diglycol carbonate resin (CR39), transparent lenses with a variety of curves (1 curve, 2 curve, 4 curve, 6 curve, 8 curve, etc.) were prepared with the thickness in the range of 8 mm to 20 mm. Then, when a gasket was set in the glass molds (male mold and female mold) for insert molding, the transparent lens was set in the concave surface side as a substitute of the mold. As in Comparative Example 2, a light absorber(s) was/were added to each CR39 monomer of about 1 mm on both sides of the polarized lens with a thickness of about 2 mm and cast molding was performed.

In the lens thus prepared through twice casting two-step molding (also referred to as two-step polymerization), it seemed temporarily that the laminated layers were integrated well, but after being left at room temperature for a while, detachment easily occurred among the convex surface layer, the concave surface layer and the polarizing film, and the lens was unavailable.

As described above, when an eyeglass lens having functionality in which an infrared absorber, for example, is added is produced, the use of a costly infrared absorber can be saved by producing a transparent prescribed portion in advance, setting the portion in a concave surface side and performing two-layer cast molding. Further, even after the eyeglass lens (semi-product) for visual correction is processed for prescription and its thickness is made uneven, almost uniform performance can be maintained.

Although a light absorber with poor weather resistance could not conventionally be added to a lens for eyeglasses, for the composite functional polarized lens of the present invention, a light absorber(s) such as a dye with poor weather resistance can be added because the convex surface layer containing a UV-blocking performance and the polarizing element can prevent ultraviolet rays from reaching the concave layer.

DESCRIPTION OF REFERENCE SYMBOLS 1 polarizing film
2 first lens substrate layer
3 second lens substrate layer
4, 14, 15 gasket
5 circular convex portion
6 locking ring
7, 8, 18, 19 resin injection hole
9, 10, 20, 21 overflow hole
11, 12, 16, 17 mold
13 spring clip
A composite functional polarized lens

What is claimed is:
1. A composite functional polarized lens, comprising:
 a polarizing film; and
 lens substrate layers comprising a predetermined resin integrally formed on both front and back surfaces of the polarizing film by insert molding in the form of cast molding, the lens substrate layers including a first lens substrate layer and a second lens substrate layer on respective opposite surfaces of the polarizing film;
 wherein the first lens substrate layer contains a photochromic light absorber, and the second lens substrate layer contains a thermochromic light absorber and does not contain the light absorber of the first lens substrate layer; and
 wherein the photochromic light absorber comprises a spirooxazine photochromic compound in an amount in a range of 0.03 to 0.2 parts by mass per 100 of resin material forming the lens, the spirooxazine photochromic compound being uniformly dispersed throughout the first lens substrate layer.
2. The composite functional polarized lens according to claim 1, wherein the predetermined resin is an allyl diglycol carbonate resin.
3. A composite functional polarized lens, comprising:
 a polarizing film; and lens substrate layers comprising a predetermined resin integrally formed on both front and back surfaces of the polarizing film by insert molding in the form of cast molding, the lens substrate layers including a first lens substrate layer and a second lens substrate layer on respective opposite surfaces of the polarizing film;

wherein the first lens substrate layer contains a light absorber as an additional component, the light absorber being an infrared absorber, and the second lens substrate layer not containing the light absorber of the first lens substrate layer;

wherein the first lens substrate layer is formed on a convex surface of the polarizing film; and wherein the infrared absorber comprises a diimmonium compound in an amount in a range of 0.05 to 10 parts by weight per 100 of resin material forming the lens.

4. The composite functional polarized lens according to claim 3, wherein the predetermined resin is an allyl diglycol carbonate resin.

\* \* \* \* \*